United States Patent [19]

Pedersen et al.

[11] 4,263,327
[45] Apr. 21, 1981

[54] PROCESS FOR THE PRODUCTION OF SUGARLESS CHEWING GUM

[75] Inventors: Arne M. Pedersen, Vanløse; Henning Sonder, Tastrup, both of Denmark

[73] Assignee: Chr. F. Petri's Eftf. I/S, Vanløse, Denmark

[21] Appl. No.: 6,984

[22] Filed: Jan. 29, 1979

[30] Foreign Application Priority Data

Feb. 3, 1978 [DK] Denmark ............................... 496/78

[51] Int. Cl.³ ............................................. A23G 3/30
[52] U.S. Cl. ...................................... 426/3; 426/548; 426/658
[58] Field of Search ......................................... 426/3–6, 426/548, 658; 424/48

[56] References Cited

U.S. PATENT DOCUMENTS

| | | | |
|---|---|---|---|
| 1,807,704 | 6/1931 | Pappadis | 426/4 |
| 3,352,689 | 11/1967 | Bilotti | 426/3 |
| 3,857,965 | 12/1974 | Ream | 426/3 |

*Primary Examiner*—Jeanette M. Hunter
*Attorney, Agent, or Firm*—Lawrence Rosen

[57] ABSTRACT

A sugarless chewing gum composition of improved quality is prepared from an ordinary chewing gum base, using sorbitol as a sweetener. According to the invention 75–100% of the sorbitol is used in the form of a highly evaporated sorbitol syrup, containing gluconic acid or a water-soluble salt of such acid, preferably in the ratio of 2–12 parts by weight to 100 parts by weight of sorbitol.

6 Claims, No Drawings

PROCESS FOR THE PRODUCTION OF SUGARLESS CHEWING GUM

The invention relates to a process for the production of sugarless chewing gum, in which sorbitol is used instead of sugar to give the product a sweet taste.

Owing to the injurious effect on the teeth caused by the chewing of sugar-containing chewing gums, an extensive research has been carried out to find sweet-tasting products which could replace the sugar in chewing gums and especially the interest has been concentrated upon the use of sorbitol, since it has been shown that this substance is not, or at least not to a substantial degree, injurious to the teeth.

Further, the use of sorbitol in a chewing gum has other advantages, since it has consistency-improving properties, and the use of it also makes it possible for diabetics to partake of such sorbitol-sweetened chewing gums, because they are less insulin-demanding than are the common kinds of sugar.

The greatly expanding consumption of chewing gum, especially by young people, has made the use of sorbitol of particular importance with a view to avoiding injuries to the teeth, and proposals for the use of sorbitol in chewing gum have been made by several parties. These proposals have comprised the use of sorbitol and mannitol as sweeteners. However, the first experiments in this direction were not particularly successful, since the consistency of the chewing gum was not satisfying.

Addition of gelatin and various vegetable gums were tried, but with no satisfying results until finally gum acacia was arrived at.

According to U.S Pat. No. 3,352,689, it should thus be possible to get a substantial improvement in consistency by mixing a solution of gum acacia in water at a temperature below 70° C. with a chewing gum base of the usual kind and artificial sweeteners to form a substantially uniform mixture, to which is then added solid sorbitol, solid gum acacia and mannitol, after which mixing proceeds at a temperature of 35°–50° C. with addition of flavouring substances to get a homogeneous mass, from which the chewing gum units are formed.

A further development is represented by the U.S. Pat. No. 3,857,965, according to which chewing gum is produced by melting crystalline sorbitol, mixing the melted sorbitol with gum base and a crystallization inhibiting substance, and forming the homogeneous mixture.

Alternatively, according to the patent, instead of the crystalline sorbitol an aqueous solution of sorbitol can be used, which has been concentrated by evaporation and has a content of glycerol and/or mannitol as an inhibitor of crystallization. This process is said to result in a better workability and easier product forming of the chewing gum composition.

According to the latter patent, gum acacia is also used as a consistency improving agent, but in order to prevent the composition from becoming crumbly and non-workable, the specification states that the proportions of the various ingredients must be carefully adjusted mutually, and according to the specification, the optimal amounts of the individual ingredients has to be determined empirically.

This results in substantial technical processing problems, since the raw materials in question are not particularly welldefined so that simply a change of supplier can cause a total failure of an otherwise trustworthy process.

The invention has for its object to remove this disadvantage, and it has surprisingly been found that an addition of relatively small amounts of sugar acids, such as gluconic acid, glucuronic acid, or galacturonic acid, or water-soluble salts thereof, e.g. alkali metal salts, makes it possible to achieve this object.

The characteristic feature of the present process thus is that a highly evaporated sorbitol syrup, containing a sugar acid, or a water-soluble salt of such acid for controlling the crystallization of the sorbitol, is used as a sweetener.

In this manner, processing advantages are obtained not only in that the chewing gum composition becomes easier workable into individual pieces, and in that the process becomes insensitive to variations in the compositions of the raw materials, but also in that the products get an improved storing stability.

In addition to the evaporated sorbitol syrup, a minor amount of solid sorbitol may be admixed to improve the texture of the composition, the ratio of solid sorbitol to evaporated sorbitol syrup not exceeding 1:4.

In a preferred embodiment of the present process, there is used, in the production of a sorbitol sweetened chewing gum according to the invention, a ratio of sorbitol to sugar acid or salt thereof between 100:2 and 100:12, preferably between 100:6 and 100:10.

Particularly as regards chewing gum, it is extremely important that a modification takes place of the physical properties of sorbitol by adding a sugar acid or a salt thereof, because it has proved that such chewing gum can be kept stored for long periods without becoming hard, just as the said addition also improves the texture of the chewing gum composition. This is due to a controlling of the crystallizing tendency of the sorbitol resulting from the addition, just as the possibility of influencing the hardening of the chewing gum composition by the addition cannot be precluded.

According to the invention, it is particularly appropriate that the sugar acid salt is sodium gluconate, and that evaporation of the sorbitol syrup is performed after addition of the sodium gluconate.

The advantage of this is that after addition of the sodium gluconate, the sorbitol syrup, usually containing about 70% of dry matter, can be evaporated to a very high concentration, 90% or above, and still remain in a plastic condition in which it can be handled without difficulty, for instance in mixing with the gum base, and that the readymixed chewing gum composition, has a texture allowing for cutting and shaping without cracking and other undesired surface disturbances.

Moreover, even including the evaporation costs, the sorbitol syrup is a substantially cheaper raw material than is the solid sorbitol.

The commercial grades of solid sorbitol and sorbitol syrup, which are used in the production of sugarless chewing gums, usually contain minor amounts of mannitol which, according to the U.S Pat. No. 3,857,965 mentioned hereinbefore, has a consistency improving effect. However, the contribution in this respect supplied by a content of mannitol in the raw material used in the present process, cannot by far compete with the effect which is due to the sugar acid or its salt.

Without addition of a sugar acid or a sugar acid salt, it is not either possible to evaporate a commercial sorbitol syrup to an extent when it can be used in an economical manner as the major sorbitol raw material.

To illustrate this point, two portions of sorbitol syrup, one without any addition, and the other with addition of 8% by weight of sodium gluconate, were evaporated to a content of 95% dry matter. The evaporated products were allowed to cool to 20° C. and left standing for observation. In less than 20 hours, the product without sodium gluconate solidified to a crystalline, hard mass, while the other product remained a clear and viscous mass for all of the observation period covering several days.

In the production of a chewing gum composition by the present process, a good result is got if the percentage by weight of the essential ingredients is kept within the following ranges:

| | |
|---|---|
| Gum base | 20-30%, preferably 24-26% |
| Solid sorbitol | 0-25%, preferably 16-22% |
| Sorbitol syrup | 40-70%, preferably 45-60% |
| Sugar acid or salt | 2-9%, preferably 4-6% |

To this mass is usually admixed a minor amount, e.g. 1-3%, of calcium or magnesium phosphate or carbonate to serve as a polishing agent for the teeth during the chewing, and further flavouring substances as e.g. peppermint oils and menthol, usually in mounts of 0.1-1.5%.

Typical compositions and the process of producing them are illustrated by the following examples.

EXAMPLES

The ingredients are the following:

| | I | II | III |
|---|---|---|---|
| | | Parts by weight | |
| Gum base (commercial product) | 27 | 23 | 21 |
| Solid sorbitol | 4 | 20 | 25 |
| 70% sorbitol syrup, evaporated to 95% | 63 | 47 | 42 |
| Sodium gluconate | 2 | 6 | 8 |
| Calcium phosphate | 2.5 | 2.5 | 2.5 |
| Flavouring agents in the form of a mixture of peppermint oils and menthol | 1.5 | 1.5 | 1.5 |
| | 100 | 100 | 100 |

The gum base is kneaded in a mixer till its temperature has increased to 50°-60° C. Simultaneously, sodium gluconate is admixed to the sorbitol syrup in a stirrer and dissolved by stirring, after which is evaporated to a content of 95% dry matter, and the evaporated, warm solution (65° C.) is poured into the mixer and mixed with the gum base. Then the solid sorbitol and the calcium phosphate are admixed and finally the flavouring agents.

The final mixture has a consistency making it well suited for rolling out and cutting.

What is claimed is:

1. In a process for the production of a sugarless chewing gum composition comprising admixing a chewing gum base and sorbitol as a sweetner; the improvement which comprises initially admixing sorbitol syrup with a gluconic acid or a water-soluble salt thereof, the latter being present in an amount sufficient to control crystallization of sorbitol, evaporating the resulting admixture to a sorbitol concentration of at least 90% and then combining the concentrated admixture with a gum base to form a chewing gum composition.

2. In the process of claim 1 wherein the sorbitol and the gluconic acid or salt thereof are present in a weight ratio of 100:12 and 100:2.

3. In the process of claim 1 or 2, the improvement which comprises utilizing sodium gluconate.

4. A sugarless chewing gum composition comprising an admixture of the following ingredients:

| | % by wt. |
|---|---|
| gum base | 20 to 30 |
| sorbitol syrup, 95% solids | 40 to 70 |
| [sugar] gluconic acid or water-soluble salt thereof | 2 to 9 |

5. The sugarless chewing gum of claim 4 wherein the essential ingredients also contain up to 25% by weight of solid sorbitol.

6. The sugarless chewing gum of claim 4, the improvement which comprises utilizing sodium gluconate.

* * * * *